(12) United States Patent
Schreiber (10) Patent No.: US 11,253,085 B2
(45) Date of Patent: Feb. 22, 2022

(54) KIT, DISPLAY CASE, COMPONENTS THEREFOR AND EDGE PROFILE

(71) Applicant: Bernd Schreiber, Geyer (DE)

(72) Inventor: Bernd Schreiber, Geyer (DE)

( * ) Notice: Subject to any disclaimer, the term of this patent is extended or adjusted under 35 U.S.C. 154(b) by 0 days.

(21) Appl. No.: 16/813,115

(22) Filed: Mar. 9, 2020

(65) Prior Publication Data

US 2020/0281373 A1 Sep. 10, 2020

(51) Int. Cl.
*A47F 3/12* (2006.01)
*A47F 3/00* (2006.01)
*F16B 5/00* (2006.01)

(52) U.S. Cl.
CPC ........... *A47F 3/12* (2013.01); *A47F 3/004* (2013.01); *A47F 3/005* (2013.01); *F16B 5/0084* (2013.01)

(58) Field of Classification Search
CPC .. A47F 3/004; A47F 3/005; A47F 3/12; F16B 5/0084
USPC .................................................. 312/114, 140
See application file for complete search history.

(56) References Cited

U.S. PATENT DOCUMENTS

| | | | | | |
|---|---|---|---|---|---|
| 4,126,364 | A | * | 11/1978 | Reilly | F16B 12/50 312/140 |
| 5,022,719 | A | * | 6/1991 | Amstutz | A47F 3/005 312/140 |
| 5,470,139 | A | * | 11/1995 | Hsiao | A47B 47/005 312/111 |
| 5,503,471 | A | * | 4/1996 | Aspenwall | A47B 57/26 312/140 |
| 6,042,202 | A | | 3/2000 | Goppion | |
| 6,398,322 | B1 | * | 6/2002 | Chaplin | A47F 3/005 312/114 |
| 10,555,625 | B2 | | 2/2020 | Frank | |

FOREIGN PATENT DOCUMENTS

| | | |
|---|---|---|
| DE | 19634322 A1 | 2/1998 |
| DE | 19634322 C2 | 1/1999 |
| DE | 10128888 A1 | 12/2002 |
| EP | 0882418 A1 | 12/1998 |
| EP | 3035827 | 6/2016 |
| EP | 3035827 B1 | 2/2017 |

* cited by examiner

*Primary Examiner* — James O Hansen
(74) *Attorney, Agent, or Firm* — Laurence A. Greenberg; Werner H. Stemer; Ralph E. Locher (57) ABSTRACT

A kit forms a display case or a part of a display case. The kit has at least one frameless side panel with a panel front side, a panel back side, a panel edge extending between the panel front side and the panel back side and four panel corners, and at least one profile strip, which extends along the panel edge from a first of the side corners to a second of the side corners. The profile strip has a fixation section covering either the panel edge and the panel back side in an edge region, or only the panel back side in an edge region, or only the panel edge, and a holding section being subsequent to the fixation section holding a cover or bottom plate. By the kit the display case can be assembled solidly and is easily disassembled.

11 Claims, 8 Drawing Sheets

KIT, DISPLAY CASE, COMPONENTS THEREFOR AND EDGE PROFILE

BACKGROUND OF THE INVENTION

Field of the Invention

The present invention relates to a kit for providing a display case or a part of a display case. The kit contains at least one frameless side panel containing a front side panel, a back side panel, a panel edge extending between the front side panel and the back side panel and four panel corners, and at least one profile strip, extending along the panel edge from a first of the panel corners to a second of the panel corners. The profile strip contains a fixation section either covering the panel edge and the back side panel in an edge region or only the back side panel in an edge region or only the panel edge, and a holding section subsequent to the fixation section, for example holding a cover plate or a bottom plate.

The invention furthermore relates to a display case as well, to two profile strips flexibly connected by a profile strip connecting element for usage in a kit according to the invention or a display case according to the invention, and to an edge profile.

Glass display cases are often used for exhibits in exhibitions because exhibits can be viewed therein from several sides and at the same time, the exhibits provided in the display case are protected from environmental influences such as dust, ultraviolet light, or touch by a person.

It is of advantage, particularly for display cases, which have to be transported frequently, when the display cases are easily mountable and dismountable and are not bulky. The dismountable display cases should have a small space requirement, should take as little loading space as possible, and should be easy to pack so that they are not damaged during the transport.

Therefore, display cases have been developed, which can be disassembled as well as reassembled easily and quickly, whereby these are easy to transport.

Such a display case has been developed, amongst others, by the company named Frank Europe GmbH. The display case of Frank Europe GmbH contains individual display case panels, profile strips, which are plugged on edges of the display case panels, and corner connectors for connecting adjacent profile strips. By not deploying adhesives and sealants for connecting the display case panels, the known display case can be assembled and disassembled as often as desired. However, since no adhesives at all have been used in the known display case, the panels forming the display case can only be kept in an assembled state by means of clamping fixtures. For this purpose, it is necessary to place a profile strip on all panel edges of the panels—both on the vertical as well as on the horizontal panel edges. However, by providing so many profile strips, not only the assembly and the disassembly of the display case become more complicated but also the visual appearance and the view inside the display case are affected in a negative way. The arrangement of the profile strips used in the known display case has also proven disadvantageous, especially with regard to the cleaning and the visual appearance of the display case. Thus, the used profile strips completely encompass the edges of the display case panels so that the profile strips are not flush with the front side of the respective panel.

A further display case that can be assembled and disassembled again is described in document published, non-prosecuted German patent DE 101 28 888 A1. That display case is made of display case walls and a profile frame consisting of individual partial frames, being plugged onto the display case walls. The profile frame has a tongue and groove system which serves for assembling the profile frame and thus forming the display case. In this case too, profile frames run along all edges of the display case, whereby not only the visual appearance of the display case is impaired, but also the visibility of the objects placed in the display case is restricted. Moreover, the arrangement of the display case is relatively complex due the usage of the tongue and groove system.

A display case is known from published, European patent application EP 0 882 418 A1, corresponding to U.S. Pat. No. 6,042,202, in which two glass plates set at a right angle adjacent to each other are connected to each other by a construction containing a locking rod and connecting elements. For this purpose, different profile strips are glued to the ends of the glass plates, respectively. The locking rod, containing segments with a lower cross section and segments with a higher cross section is held at a first of these profile strips. At a second of these profile strips, spaced apart connecting elements are provided with a C-shaped cross section. To connect the two glass plates, the connecting elements are brought to the height of the segments with a lower cross section by a manually moveable sliding component and are slid on these.

A display case is disclosed in the published, European patent application EP 3 035 827 A0, corresponding to U.S. Pat. No. 10,555,625, in which two glass plate elements adjacent to each other at a right angle are connected to each other by means of profiled edge stripes, glued to the front side of the glass plate elements, in to which a profile rail is introduced.

Published, non-prosecuted German patent application DE 196 34 322 A1 proposes a connection of two wall parts of a display case, in which a fixation rail is glued respectively onto the inner sides of the wall parts, each of which has a hook rack. In the corner formed between the wall parts, a connecting element is provided, which is made of a fitting part, a clamp, screw elements, and springs. The arched clamp having flanks and pressing against the springs is changed in its position by the screw elements so that it can engage behind the respective hook racks.

A display case is described in German patent DE 196 34 322 C2, which consists of detachably connected walls, namely side walls, doors and a cover part. The walls are formed of glass and are braced with connecting elements. For connecting two walls, fixation rails are glued to the side back walls of the walls in a given position. The fixation rails are connected to each other by means of a connecting element. The connecting element is made of a clamp and a fitting part, whereby the fixation rails are firmly fixed with the fitting part and the clamp in the connection state, so that the walls themselves are held without tension.

European patent EP 3 035 827 B1 also describes a display case that can be assembled and disassembled as often as desired. The display case described in the European patent EP 3 035 827 B1, which is formed of individual glass plate elements, is held together by fixation elements glued to the glass plate elements and corresponding profile rails. The profile rails have profile stripes arranged at two opposing sides so that a positive engagement of assigned fixation elements of two glass plate elements arranged in alignment to each other is enabled by means of a profile rail. Depending on the embodiment of the fixation elements and the profile rails, the assembling and disassembling of the display case can, however, prove to be quite challenging.

SUMMARY OF THE INVENTION

Thus, it is the object of the present invention to provide a kit for providing a display case or a part of a display case with which the display case or the part of the display case is solidly mountable and yet easily demountable. Furthermore, a corresponding display case shall be proposed. In addition, appropriate components for such a display case shall be provided.

The object is solved on the one hand by a kit of the above mentioned type, in which the fixation section is glued with the panel edge and/or the edge region of the panel back side, and at least one insert with a therein inserted or insertable, flexibly formed profile strip connecting element provided in the holding section extending in longitudinal direction of the profile strip.

Advantageously, a display case or a part of a display case can be set up easily and with little time and in turn can be removed just as easy with the kit according to the invention.

In the present invention, a device or a component combination is understood by a display case, having at least one transparent side panel through which objects, being placed behind this side panel, are visible from the outside. That means that in the present invention, a display case does not necessarily need to have more than one side panel. It also does not necessarily need to have a cover and/or a bottom.

The kit for providing a display case or a part of a display case according to the invention contains at least one frameless side panel, a profile strip and a profile strip connecting element for connecting two profile strips, which are attached at a side panel, respectively.

In the meaning of the present invention, a display case kit contains a side panel, at least one profile strip provided at an upper or lower end of this side panel and at least one profile strip connecting element. Such a display case kit can be used for example to close a recess provided in the wall or a compartment provided in a wall unit with a glass panel afterwards and thereby forming a display case. The display case kit according to the invention can also be described as a display case kit component combination. Of course, the display case kit according to the invention can also comprise more than one side panel, for instance, four side panels and moreover a cover plate and a bottom plate with two profile strips each provided at the side panels and eight profile strips connecting elements in embodiments of the invention. In such an embodiment, it is not at all required that all side panels are transparent, for instance, are made of glass. The cover and/or bottom plates also do/does not have to be transparent or made of glass. Rather, it is sufficient when at least one of the side panels is made of glass. Furthermore, more than one side panel or all side panels as well as the cover and/or bottom plate can also be transparent.

The used side panel(s) contain(s) a panel front side, a panel back side, a side edge extending between the panel front side and the panel back side and four panel corners. It is particularly preferred when the side panel(s) is/are made of glass so that the interior of the display case formed by the display case kit is very well visible. In alternative embodiments of the display case kit according to the invention, the side panel(s) can also be made of Plexiglas or a different plate material. At least one of the side panels forming the display case can also be made of wood, plastic, or metal.

For connecting the side panels to a display case or a part of a display case, at least one profile strip is provided at each side panel. The respective profile strip hereby extends between two panel corners of the respective side panel, whereby the profile strip has the same length as the side panel. The side panels of the display case or the part of a display case can hereby be connected in such a manner that these are flush to the end when the display case or the part of a display case is closed and no unsightly gap is formed between the side panels.

Depending on the embodiment of the display case according to the invention, the respective profile strip can either be fixed at the panel edge and an edge region of the panel back side, in only one edge region of the panel back side or only at the panel edge. Preferably, the respective profile strip is hereby glued to the panel edge and/or the edge region of the panel back side. In other embodiments of the invention, the respective profile strip could, however, also be fixed to the respective side panel by a magnetic connection, a screw connection, form-locking or a different connection variant.

According to the invention, the profile strip contains a fixation section and a holding section, wherein the profile strip is attached to the respective side panel by the fixation section. The holding section of the profile strip is directly linked to the fixation section and is used for the insertion of a cover or bottom plate of the display case to be formed.

Application-specific, the cover and/or bottom plate can be made of glass, Plexiglas, plastics, wood, metal, or another material. Regarding the stability of the display case, it has, however, proven to be advantageous when particularly the bottom plate, on which for instance exhibits are placed, is not made of glass.

For a particularly good stand of the display case to be formed, it has furthermore proven convenient when feet are attached to the bottom plate. Depending on the embodiment, the number, shape, size, and material selection of the feet can vary. However, it is advantageous when the display case has at least three, preferably four feet. The feet can for instance be made of plastic, metal, or felt. Furthermore, the feet can also be height-adjustable so that irregularities of a floor, on which the display case is placed, can be compensated.

Advantageously, the profile strip comprising the fixation section and the holding section is formed in one piece. Likewise, the profile strip can also be assembled of several components. This way, the profile strip can be assembled for instance by connecting the fixation and the holding section.

For forming a particularly stable display case, which still allows a good view inside the display case, it has proven to be advantageous if a profile strip each is provided on each panel edge of the individual side panels of the display case facing upwards and downwards in a functional alignment of the display case. When assembling the individual side panels to the display case, a frame is formed extending at the upper edge and at the lower edge of the display case. By leaving out profile strips extending along the vertical panel edges, the view inside the display case is unhindered. Moreover, the assembling and the disassembling of the display case is simplified. Likewise, only one profile strip at the upper or only one profile strip at the lower end of the panel edges can be provided so that only one upper frame or only one lower frame is formed.

For an optimal connection of the profile strips forming the frames, these are advantageously cut to miter at their longitudinal ends. Likewise, the ends of the profile strips can, however, also be formed blunt. If the profile strips have miters, it is additionally favorable when the panel edges vertical in functional alignment of the display case, also have a miter so that a display case can be provided without a gap between the side panels.

Insofar as the profile strips do not contain a miter, it has proven advantageous when a profile strip is provided at one of two side panels to be connected, which is positioned in the middle of this side panel; however, the profile strip does not extend over the complete length of this side panel, but is shortened on both sides by the depth of the second side panel plus the depth of the profile strip. The side panels and profile strips to be connected can, however, also be formed differently.

For joining the profile strips provided at the side panels, at least one insert extending in longitudinal direction of the profile strip is inserted at one longitudinal end of the holding section, respectively. A flexibly formed profile strip connecting element is pluggable into the insert by means of which two colliding profile strips can be connected. Advantageously, the insert is hereby formed complementarily to the form of the profile strip connecting element.

The inserts inserted or insertable front-sided into the profile strips contain a circular internal cross section in the simplest case, wherein their cross section is small in comparison to the length. The inserts can, however, also have a quadrangular or differently formed internal cross section.

The inserts can also contain an insert device, which is for example round in cross section, a connecting bar connected to the insert device, and a fixation element guiding component, being for instance rectangular in the cross section, subsequent to the connecting bar, extending parallel to the insert device. The cross section of the inserts can hereby look like a tree standing on the ground, wherein its "treetop" corresponds to the insert device, the "tree trunk" corresponds to the connecting bar and the "ground" corresponds to the fixation element guiding component. In such an embodiment of the insert, the insert device serves for the insert of a dowel of the profile strip connecting element. The fixation element guiding device serves for an easier insertion of an opening for a fixation element into the profile strip, described in more detail in the following.

For a particularly easy insertion of the opening, which is preferably formed as thread hole, into the profile strip, it is of advantage when a height respectively a width of the fixation element guiding device has a cross section corresponding to the opening to be inserted into the profile strip.

In comparison to the fixation element guiding device, the connecting bar comprises a smaller height respectively width, whereby a slipping out of a dowel of the profile strip connecting element from the insert is hampered. In the area of the opening for the fixation element, the connecting bar is widened to the size of the fixation element, for example by drilling so that the fixation element can easy engage into the constriction of the dowel of the profile strip connecting element.

Due to the flexible design of the profile strip connecting element, the profile strips and thus the side panels of the display case can be particularly easily connected and can be arranged to each other at an angle of for example 90°. Furthermore, the display case can also be easily disassembled by using an articulated profile strip connecting element.

To connect two profile strips, the articulatedly-shaped profile strip connecting elements, which preferably but not necessarily are made of two rod-shaped, tubular or spherical elements, being connected with each other by means of a joint, are each inserted at least up to the joint in the respective insert. The joint provided between the rod-shaped, tubular or spherical elements allows for the side panels to be connected to be arranged in varying positions to each other, particularly enabling an easier assembling and disassembling of a display case to be formed thereof.

It has proven particularly favorable when the profile strip connecting element contains two dowels connected by a joint. When connecting two profile strips, a first dowel of the profile strip connecting element is hereby plugged into an insert of a first profile strip and the second dowel of the profile strip connecting element is plugged into the insert of a second profile strip. Thus, a gluing of the profile strips for forming the display case is not necessary. However, if a display case is to be formed, which is not to be disassembled afterwards, the profile strips can also be glued in addition to the connection by means of the profile strip connecting elements.

It is further possible that only a first dowel of the profile strip connecting element is glued into the insert so that this first dowel is constantly connected with the insert. A second dowel of the profile strip connecting element is, however, not glued into the insert in this embodiment so that the display case can still be disassembled, wherein the dowels cannot be lost during the disassembling and the transport of the display case.

If the profile strip connecting element comprises two dowels, the insert for the profile strip connecting element can advantageously be formed as a simple drilling. Such a drilling is not only easy to manufacture but also cost-effective to realize.

Depending on the embodiment of the display case or the part of a display case to be formed by the kit according to the invention, the dimensions of the insert and the corresponding profile strip connecting element can vary. With regard to the stability as well as the simplicity of the assembling and disassembling of the display case to be formed, it has, however, proven favorable when each dowel of the profile strip connecting element has a length between 2 cm and 8 cm and a cross section between 0.4 cm and 1 cm.

It is particularly preferred when the profile strip connecting element is made of metal, but the profile strip connecting element can also be made of wood, plastics or another material.

Regarding the fixation of the profile strip connecting element in the profile strips, it has furthermore proven favorable when the dowels comprise a constriction, respectively.

The constriction is favorably provided at an end distanced from the joint of the dowel and is formed in such a way that a fixation element can engage in the constriction, and thus a slipping out of the dowel from the insert of the profile strip can be prevented. The fixation element can be formed for example in form of a stud or a screw, which is arranged vertically or nearly vertically to the dowel, wherein an end of the stud or of the screw engages in the constriction of the dowel. In the profile strip, an opening, into which the fixation element can be included, is provided opposite to the constriction running along transversely to the longitudinal direction of the profile strip and reaching up to the inclusion in the profile strip. The opening does not fully pass through the profile strip. Through this opening, the fixation element can be inserted up to the insert from the outside through a wall of the profile strip, where an end of the fixation element, then engages in the constriction of the dowel inserted into the insert. The opening is favorably adjusted to the form and size of the fixation element, so that aforesaid can engage in the constriction through the profile strip. In the simplest case, the opening is formed as a through bore. Favorably, the opening is provided at an inner side of the profile strip, that is, at a side of the profile strip, which points to the display case interior when the display case is assembled. Thereby, neither the opening nor the inserted fixation element is seen from the outside.

In alternative embodiments of the kit according to the invention, at least one profile strip connecting element containing at least one thread, which is screwed into an insert of the profile strip, a profile strip connecting element containing balls or ball-shaped elements or a profile strip connecting element of oblong shape, whose oblong elements contain a triangular, rectangular, polygonal, oval or differently formed cross section can, however, be used instead of the dowel-shaped profile strip connecting element.

Regarding a fixation of the respective profile strip on the respective side panel, it has proven advantageous when the profile strip comprises an L-, T- or Z-shaped cross section.

This way, an L-shaped profile strip can either be attached with a longitudinal leg of a vertical side of the L at an upper or lower edge region of the panel back side or with a transverse side of the vertical leg of the L on a panel edge of the display case at the same time in a functional alignment, wherein the bottom or cover plate of the display case can be held pointing downwards or upwards by the horizontal leg of the L.

A Z-shaped profile strip is particularly suitable for being attached at an upper end of the side panel, wherein an upper horizontal leg of the Z hereby projects the upwards aligned panel edge and a vertical leg of the Z projects the upper edge region of the panel back side. The lower horizontal leg of such a Z-shaped profile strip, in turn, serves for the insertion of the cover plate.

A T-shaped profile strip can, however, be optimally attached at a lower end of the side panel. Hereby, the T-shaped profile strip can be attached at the side panel rotated by 180° so that the vertical leg of the T extends along a lower edge region of the panel back side and one half of the horizontal leg of the T extends along the panel edge pointing downwards.

In further embodiments of the kit according to the invention, the profile strip can, however, also be formed differently. Thus, the profile strip can for example be formed U-shaped, wherein the U-shaped profile strip provided at the respective side panel is rotated by 90° and the bottom or cover plate is inserted between the actually vertically aligned legs of the U.

Regarding the form of the profile strip, it has proven advantageous when the fixation section is at least formed partially complementary to an angle that is formed by the panel edge and the panel back side. By such an arrangement of the fixation section of the profile strip, the aforesaid, particularly in a Z- or T-shaped form of the profile strip, can be fixed particularly well at the side panel and can be connected with the aforesaid, for example by gluing. Hereby, a groove extending in longitudinal direction of the profile strip can be provided in the fixation section, which has the same or nearly the same cross section as the edge region of the respective side panel, at which the respective profile strip is to be attached.

In a particularly preferable embodiment of the kit according to the invention, the panel edge contains a chamfer and the fixation section contains an angular groove being provided at least partly complementary to the chamfer, wherein the chamfer is aligned in such a way that the thickness of the side panel tapers towards the holding section and the panel front side ends flush with a front edge of the fixation section. In such an embodiment of the display case kit according to the invention, the profile strip advantageously ends flush with the panel front side, wherein the side panel is at the same time safely clamped in the profile strip. A slipping out of the side panel from the profile strip is prevented by the chamfer provided at the panel edge and the angular groove formed complementary to the aforesaid. Moreover, the display case is easy to clean and visually very appealing due to the flush end of the front edge of the profile strip with the panel front side.

Hereby, it has proven particularly favorable when the chamfer forms a miter and the angular groove has a triangular cross section.

In alternative embodiments of the kit of the invention, the panel edge can also contain a step, a rectangular projection or a projection formed in a different shape or the like, by which the side panel can be held in an angular groove of the profile strip. Advantageously, the angular groove is hereby formed largely complementary to the step or the projection.

Regarding the stability of the display case to be formed with the display case kit, it has proven convenient when at least one adhesive or sealant is provided in the angular groove between the side panel and the fixation section. By attaching an adhesive or a sealant, the profile strip can be attached permanently at the respective side panel, which simplifies the assembling and disassembling of the display case, however, the aforesaid has no influence on the disassembly of the display case as the aforesaid is still given by the removable connection of the profile strips by the profile strip connecting elements. Different adhesives, silicone, acrylic or other sealants can be used as adhesives or sealants.

It has also proven advantageous when a through bore for the insertion of a fixation element is provided in the holding section that is aligned transversely to the longitudinal direction of the profile strip. By such a through bore, the bottom or cover plate placed on the profile strip can be fixed on the profile strip. For this purpose, the bottom or cover plate conveniently comprises a fixation element insertable into the through bore or a through bore formed identical to the through bore of the profile strip, in which a fixation element can be inserted. The fixation element can be for example formed in form of a screw, a stud or a threaded bolt and can be connected and held by a nut or another counter holding element such as a clamping mechanism. The number, arrangement and dimensions of the through bores and corresponding fixation elements should be chosen application-related. For fixing the bottom and/or cover plate, two through bores per profile strip are generally sufficient. Advantageously, the through bores are situated in the end sections of the profile strips.

The profile strip and thus the display case can be attached to a subfloor or underframe by means of the through bore inserted in the holding section in the same way. A for instance shifting or undesired transport of the display case can hereby be avoided. The fixation can hereby also be realized for example by screwing with the subfloor or underframe.

In order for the cover and/or bottom plate to be placed carefully, without any damage onto the profile strip, it has furthermore proven convenient when at least one sealing is provided between the holding section and the cover or bottom plate. The sealing is at least provided at one horizontally aligned surface pointing towards the bottom or cover plate, carrying the bottom or cover plate. Furthermore, the sealing can also be additionally provided at vertically aligned surfaces of the holding section, which are aligned towards the bottom or cover plate. Depending on the arrangement variant of the display case kit according to the invention, the sealing can for example be formed of rubber, silicone, acrylic, or another damping material.

For a particularly good view of the exhibits placed in the display case or the part of a display case to be formed, it has proven to be optimal when the profile strips is not higher and not wider than 1 cm in cross section. Of course, the profile strip can also be formed thinner or wider, whereby the visibility of the exhibits in the display case is impaired with increasing width and the fixability of the profile strip at the side panel is declining with decreasing thickness of the profile strip.

It is particularly preferred when the profile strip is formed of aluminum. This is not only optically appealing but also advantageous with regard to production-related and stability-related reasons. Likewise, the profile strip can however also be formed of plastics, wood or a different metal.

The object is further solved by a display case with a cover plate; a bottom plate or a subfloor; and four frameless side panels, and which contains a panel front side, a panel back side, a panel edge extending between the panel front side and the panel back side and four panel corners. The two profile strips each are provided at each of the side panels, respectively, which extend along the panel edge from a first of the panel corners to a second of the panel corners. The profile strips contain a fixation section covering either the panel edge and the panel back side in an edge region, or only the panel back side in an edge region, or only the panel edge, and a holding section subsequent to the fixation section, holding the cover or the bottom plate or the base frame or the subfloor.

The display case according to the invention is characterized in that the fixation section is glued to the panel edge and/or the edge region of the panel back side, and in that at least one insert with an inserted or insertable, flexibly formed profile strip connecting element extending in longitudinal direction of the profile strip is provided therein. This display case is covered by the scope of protection of the present invention.

The present invention furthermore relates to two profile strips connected flexibly with each other by a profile strip connecting element for usage in a display case kit according to the invention. Each of the profile strips contains a straightly extending fixation section, which is gluable to a panel edge and/or an edge region of a panel back side, and a holding section, in which at least one insert extending in longitudinal direction of the profile strip is provided, wherein the profile strip connecting element is received in the insert of both profile strips.

In a preferred arrangement, the profile strip connecting element contains two dowels connected with each other by a joint, which are each plugged into an insert of the profile strip to connect the two profile strips. Due to the joint provided between the two dowels, the profile strips can be arranged in varying angles to each other. This has proven advantageous particularly when assembling and disassembling a display case to be formed therewith.

For a particularly good hold of the dowels in the inserts of the profile strips, the dowels advantageously each comprise a constriction. The respectively used profile strip connecting element can, however, be formed entirely different as well. Thus, the profile strip connecting element can for example comprise two rod-, tube-, ball-, cone- or cube-like elements, which are connected to each other by means of a joint. In further embodiments of the invention, a flexible connection of these two elements can also be omitted and the two elements can be arranged to each other at a defined angle. In order to guarantee a good hold of the two elements in the inserts of the profile strips to be connected by these two elements, it is of advantage when the inserts of these profile strips to be connected are formed complementary or at least partly complementary to the elements of the respective profile strip connecting element to be inserted into these inserts.

The profile strips themselves can advantageously be formed as elongated rails, which contain a holding section and a fixation section. The profile strip can be fixed on a panel, for example a side panel of a display case or a display case element by the fixation section made of glass. The holding section of the profile strip, which is directly subsequent to the fixation section, serves for the insertion of a panel, for example a cover or bottom plate of a display case or a display case element.

The profile strips can for example comprise an L-, T-, or Z-shaped cross section, whereby these can be particularly easily fixed on a panel and a holding section is formed at the same time, which serves for the insertion of another panel. The profile strips, that is the holding section and the fixation section, are preferably formed in one piece.

The inserts used for the insertion of the profile strip connecting elements are arranged front-sided in the profile strips. Depending on whether the profile strip shall be connected with one or two additional profile strips, the inserts can be provided on both sides or in a front side of the profile strip.

For a flush connection of the profile strips with each other, it is furthermore favorable when the profile strips contain a miter at their connection sides.

Regarding the embodiment of the profile strips, it has furthermore proven advantageous when the profile strips are formed of aluminum and are not higher and wider than 1 cm in their cross section. Likewise, the profile strips can also be formed of wood, plastic, glass or a different metal and comprise other dimensions.

In a favorite embodiment of the display case of the present invention, the display case contains at least one edge profile.

The edge profile is provided or constructed for a provision between two of the frameless side panels, wherein said side panels each have a miter or a tip on at least one end. An angle is formed between an inner side and the miter or tip of the side panel, respectively. The miter or the tip is introduced in an angled miter seat or tip seat, respectively, of said at least one edge profile. The at least one edge profile contains a first edge profile part and a second edge profile part being a mirror-inversed construction of the first edge profile part. The first edge profile part and the second edge profile part each have a cross section having a triangularly shaped outer portion with an outer portion hypotenuse, a first outer portion cathetus and a second outer portion cathetus, wherein between the first outer portion cathetus and the second outer portion cathetus a right angle is formed, an inner portion being formed as one piece with the outer portion or being fixed at the outer portion and having an inner portion hypotenuse and at least one inner portion cathetus. Wherein between the inner portion hypotenuse and the inner portion cathetus an acute angle is formed; wherein the outer portion hypotenuse and the inner portion hypotenuse are provided parallel to each other. The angled miter seat or tip seat, respectively, is provided between said second outer portion cathetus and the inner portion hypotenuse. The first edge profile part and the second edge profile part each have a notch provided parallel to the respective first outer portion cathetus; and wherein the edge profile contains a connecting and sealing unit having a U- or V-shaped cross-section with two legs being introduced or formed for an introduction into the respective notches.

The embodiment prevents an undesired penetration of a person into the display case by opening a connection between the miters or tips such as by cutting. The edge profile can be installed without the need to introduce them from above. Therefore, for an installation of the edge profile of said embodiment of the present invention, there are no special place requirements above the display case. Nevertheless, the corner of the display case provided with said edge profile has a pleasant look.

Both outer portions form an outside of the corner. By the connecting and sealing unit being introduced from the outside into the outer portions, the edge profile parts are connected and this connection is sealed from dust of the outside of the display case.

The miters or the tips of the side panels of the display case are hold in a tight and safe manner in the miter seats or the tip seats provided between the outer portion and the inner portion of the respective edge profile parts, respectively.

Because of the two edge profile parts, each of the edge profile parts can be stuck on a side edge of the respective side panel following a connection of the edge profile parts by the connecting and sealing unit to assemble of the display case. It is not necessary to slide the edge profile from above onto the side edges of the side panels of the display case.

The connecting and sealing unit is introduced from the outside into the notches. The connecting and sealing unit can be of rubber. By means of the connecting and sealing unit, an agglutination of the side walls of the display case is not necessary, since the connecting and sealing unit can provide dust-proofness.

In some embodiments of the present invention, it is sufficient when the respective inner portion comprises only two legs, to say, the inner portion hypotenuse and one inner portion cathetus. In this case, the inner portion catheti of the inner portions of the edge profile parts are in line.

In another embodiment of the invention, each of the inner portions contains a first inner portion cathetus and a second inner portion cathetus having a right angle therebetween, wherein the first outer portion cathetus is in parallel with the first inner portion cathetus. In this embodiment, the inner portions are formed triangularly, which improves their mechanical stability.

The connecting and sealing unit can be formed in an embodiment of the present invention as a U-shaped brace. The connecting legs of the brace are always parallel to each other and are connected at an outside of the connecting and sealing unit by a stable bridging rack. With the embodiment, the side panels of the display case are fixed in a right angle orientation to each other.

In a further embodiment, the edge profile parts are connected at outer ends of their outer portion catheti, in particular of their first outer portion catheti, by a hinge. By the hinge, the edge profile parts can be folded apart and collapsed. Thus, a door of the display case can be formed by one of side panels at this corner of the display case. If this door is closed, the side panels of the display case are oriented in a right angle to each other. If said door is open, the angle between the side panels of the display case is a variable obtuse angle.

Favorably, the outer portions are of a solid material, such as of solid aluminum. This guarantees a high mechanical stability of the display case.

In a next embodiment, the inner portions of the edge profile parts are internally hollow and/or form a hollow space therebetween. The hollow space allows an accommodation of means being necessary for the display case, such as electric cables. Furthermore, the hollow space can be used to accommodate screwing of at least one shelf carrier or slope inside the display case.

In another favorite embodiment of the present invention, the second inner portion catheti of the edge profile parts are in line. Thus, said second inner portion catheti form at an inner side of the corner of the display case a smooth plane on which means being necessary for the display kit, such as an LED rail, can be led.

In another embodiment of the present invention, the at least one edge profile consists of at least two edge profile pieces being vertically stacked. In this embodiment, each of the at least two edge profile pieces is provided between the two frameless side panels, wherein the miter or the tip of the respective side panel is introduced in an angled miter seat or tip seat of the edge profile piece. Furthermore, each of the at least two edge profile pieces contains a first edge profile part and a second edge profile part being a mirror-inversed construction of the first edge profile part; wherein the first edge profile part and the second edge profile part each have a cross section having a triangularly shaped outer portion with an outer portion hypotenuse, a first outer portion cathetus and a second outer portion cathetus, wherein between the first outer portion cathetus and the second outer portion cathetus a right angle is formed, and a triangularly shaped inner portion being formed as one piece with the outer portion or being fixed at the outer portion and having an inner portion hypotenuse and at least one inner portion cathetus. An acute angle is formed between the inner portion hypotenuse and the at least one inner portion cathetus. The outer portion hypotenuse and the inner portion hypotenuse are provided parallel to each other. The angled miter seat or tip seat is provided between the second outer portion cathetus and the inner portion hypotenuse; wherein the first edge profile part and the second edge profile part each have a notch provided in parallel to the respective first outer portion cathetus. Furthermore, several connecting and sealing units having a U- or V-shaped cross-section with two legs are introduced or formed for an introduction into the respective notches. This embodiment is particularly suitable for long side edges of the side panels of the display case.

The embodiment is especially advantageous, if at least one inner portion of the at least two edge profile pieces has a flat upper surface. The flat upper surface can be used, for instance, as a carrier surface such as for holding an intermediate shelf of the display case.

Furthermore, edges of the edge profile parts can be flattened or rounded. Thus, injuries at the edges can be prevented.

Other features which are considered as characteristic for the invention are set forth in the appended claims.

Although the invention is illustrated and described herein as embodied in kit, display case, components therefor and edge profile, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

It is noted that the same reference numbers in FIGS. 1 to 9 refer to the same components.

Figure 1:
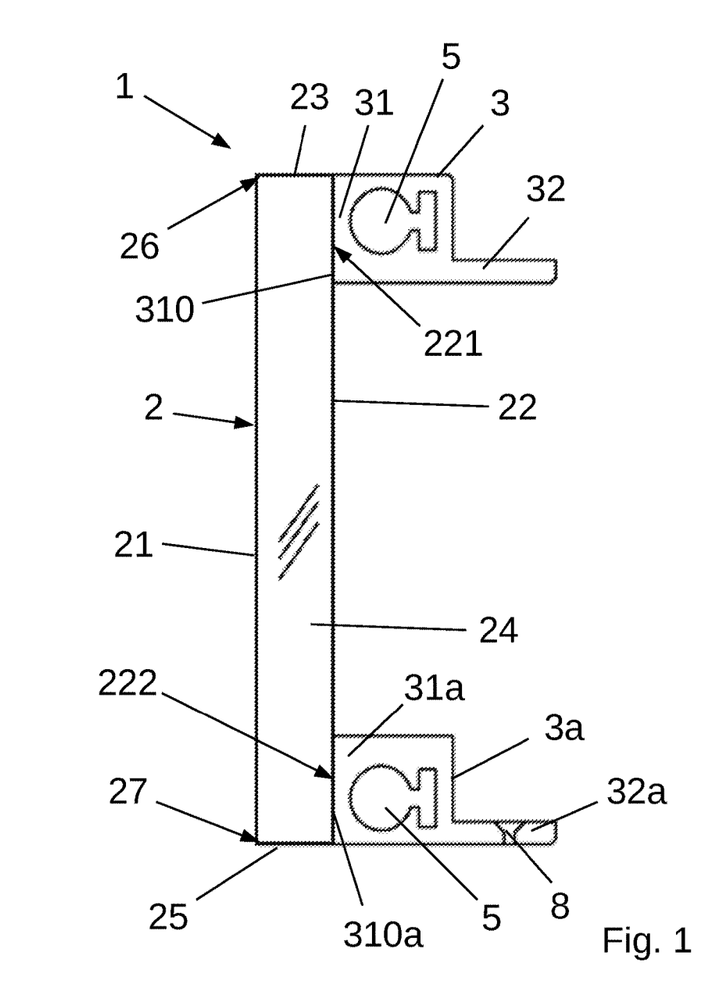
FIG. 1 is a diagrammatic, side view of an embodiment of a kit according to the invention.

Referring now to the figures of the drawings in detail and first, particularly to FIG. 1 thereof, there is shown an embodiment of a kit 1 according to the invention in a side view.

The kit 1 contains a side panel 2 made of glass and two profile strips 3, 3a provided on a panel back side 22 of the side panel 2. Hereby, a first profile strip 3 is glued to an upper edge region 221 of the panel back side 22 and the second profile strip 3a is glued to a lower edge region 222 of the panel back side 22.

The first profile strip 3 as well as the second profile strip 3a is formed of aluminum and contains a fixation section 31, 31a that is rectangular in the cross section as well as a holding section 32, 32a that is L-shaped in the cross section. In further variants of the kit 1 according to the invention, the profile strip 3, 3a can, however, also be made of plastic, wood, or any other metal and comprise a different cross-sectional shape.

The fixation section 31, 31a serves for the fixation of the profile strip 3, 3a at the side panel 2 subsequent to the fixation section 31, 31a. The holding section 32, 32a, herein integrally formed with the fixation section 31, 31a, serves for holding a cover plate 4 respectively and a bottom plate of the display case to be built with the kit 1. In alternative embodiments of the kit 1, the fixation section 31, 31a and the holding section 32, 32a can also consist of two individual components and can for example be connected with each other by means of gluing.

A through bore 8 extending transversely to the longitudinal direction of the profile strip 3a is provided in the holding section 32a of the profile strip 3a attached in the lower edge region 222. The through bore 8 serves for the fixation of the profile strip 3a and thus of the side panel 2 on a base frame respectively a subfloor that is not depicted. A slipping or undesired transport of a display case formed by the kit 1 is thus avoided respectively made more difficult. Furthermore, the through bore 8 can also be used for fixing the bottom plate on the profile strip 3a.

In alternative embodiments of the kit 1 according to the invention, the profile strip 3 holding the cover plate 4 can also contain such a through bore 8 that the cover plate 4 can also be connected with the profile strip 3, whereby an ingress into the display case is impaired. Likewise, the cover plate 4 respectively the bottom plate can also be connected with the profile strip 3, 3a in any other way, for example by means of at least one magnet or a temporary adhesive.

For connecting side panels containing two profile strips 3, 3a to a display case, inserts 5 for the insertion of a profile strip connecting element 6 are provided in the holding sections 32, 32a of the profile strips 3, 3a. In the embodiment of the display case kit 1 depicted in FIG. 1, an insert 5 each extending in longitudinal direction of the profile strip 3, 3a is arranged at each longitudinal end of each holding section 32, 32a. Thus it is possible for the side panel 2 to be connected on both sides with another side panel, respectively and for a cuboid display case to be arranged.

In the depicted embodiment, the inserts 5 are formed as a blind hole, which has the advantage that the inserts 5 can be easily and cost-effectively produced. However, in further variants of the kit 1 according to the invention, the inserts 5 can also have different forms. Favorably, the inserts 5 always comprise a form that is complementarily formed to the profile strip connecting elements 6, since the profile strip connecting elements 6 can thus be held particularly securely in the inserts 5. The length of the insert 5 as well as its cross section and the corresponding dimensions of the used profile strip connecting element 6 should advantageously be chosen application-specific, are however particularly dependent on the dimensions of the holding section 32, 32a.

Figure 6:
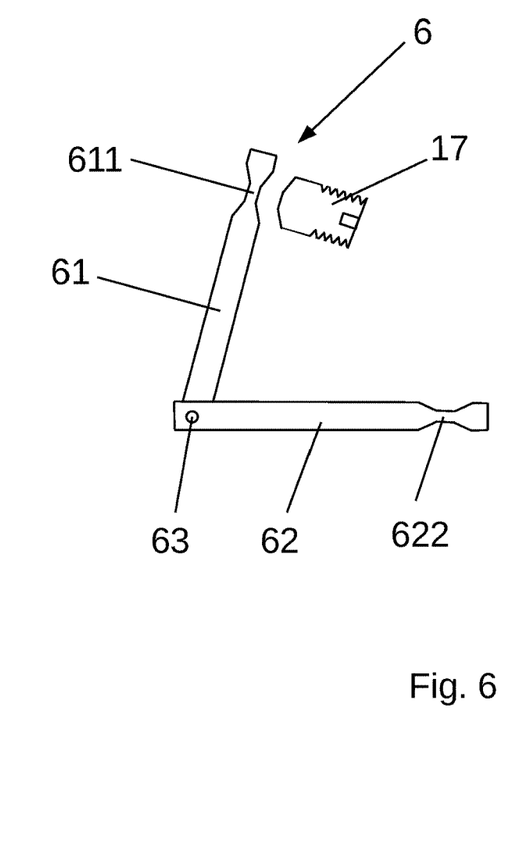
FIG. 6 is a top view of a profile strip connecting element associated with the display case kit according to the invention.

In the embodiment of the kit 1 depicted in FIG. 1, the profile strip connecting element 6 is formed in an articulated manner as depicted in FIG. 6 and is made of two dowels 61, 62, which are coupled by a stud 63. For connecting two side panels 2, a first dowel 61 of the profile strip connecting element 6 is plugged into the insert 5 of the upper profile strip 3. A second dowel 62 of the profile strip connecting element 6 is plugged into an insert 5 of a profile strip 3, 3a also provided in an upper edge region of a further non-depicted side panel. Due to the articulated embodiment of the profile strip connecting element 6, both side panels can be particularly easily connected with each other and can be arranged at an angle of 90° or any other angle between 90° and 180° to each other.

Since the profile strip connecting element 6 is only plugged into the respective insert 5, a simple assembling and disassembling of the display case to be formed by the display case kit 1 is possible. Moreover, the dowel 61, 62 of the profile strip connecting element 6 can also be glued into the respective insert, whereby a loss of the profile strip connecting element 6 during the disassembling and the transport of the display case formed by the kit 1 can be prevented.

As a result of the embodiment of the profile strips 3, 3a with a maximal height of 1 cm, the frame of the side panel formed by the profile strips 3, 3a respectively of the display case to be formed by the kit 1 is hardly visible and then allows a good view into the interior of the display case. Since the profile strip connecting elements 6 disappear inside the frame formed by the profile strips 3, 3a after the assembling of the display case, a display case that is visually very appealing can furthermore be provided by the display case kit 1.

Figure 2:
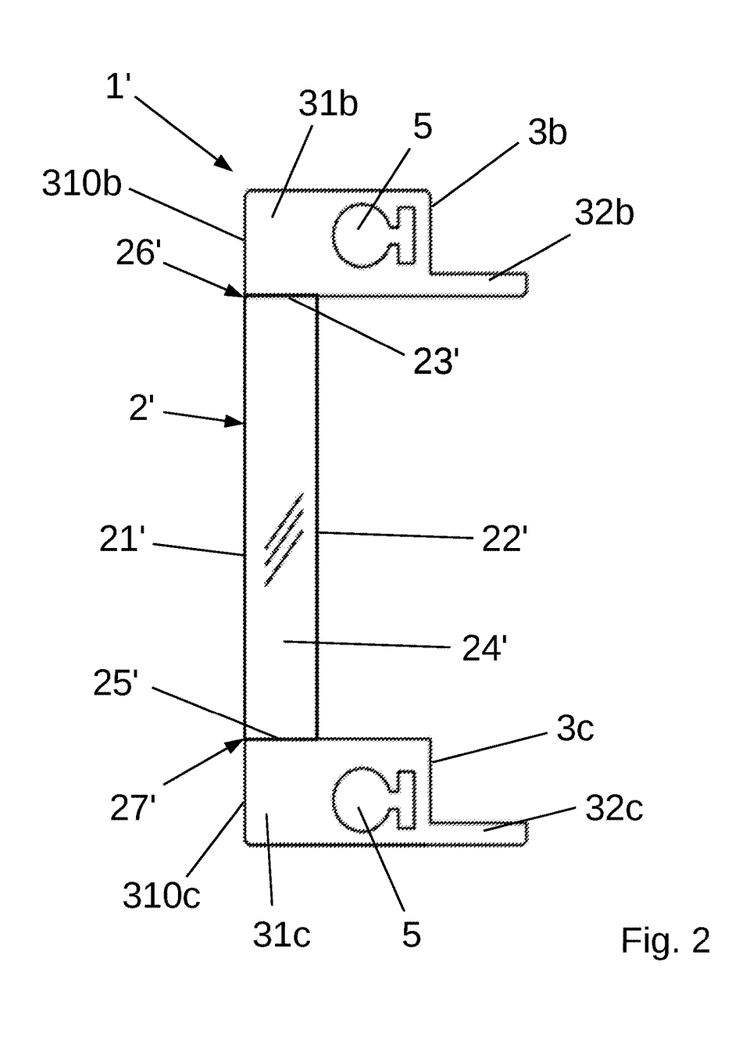
FIG. 2 is a side view of a second embodiment of the kit according to the invention.

FIG. 2 shows a further embodiment of a kit 1' according to the invention in a side view.

In contrast to the first embodiment of the display case kit 1 according to the invention depicted in FIG. 1, the profile strips 3b, 3c are attached on side edges 23', 25' pointing upwards and downwards in a functional alignment of the display case to be formed by the display case kit 1' of the display case kit 1' shown in FIG. 2. For this purpose, the fixation sections 31b, 31c of the profile strips 3b, 3c are formed longer compared to the fixation sections 31, 31a of the profile strips 3, 3a of FIG. 1.

Just like the profile strips 3, 3a of FIG. 1, the profile strips 3b, 3c of FIG. 2 are also glued with the panel edges 23', 25'.

Contrary to the variant depicted in FIG. 1, no through bore 8 is provided in the lower profile strip 3c in the embodiment of the kit 1' of FIG. 2, so that the profile strip 3c can neither be screwed with a base frame nor with a subfloor nor with a bottom plate. Insofar as such a through bore 8 is omitted, the display case formed by the kit 1' is either simply placed on a base frame or a subfloor or is connected with the base frame or subfloor in another way. Thus, the display case respectively the lower profile strips 3c of the display case can be fixed on the base frame or subfloor, for example by means of a temporary adhesive.

Figure 3:
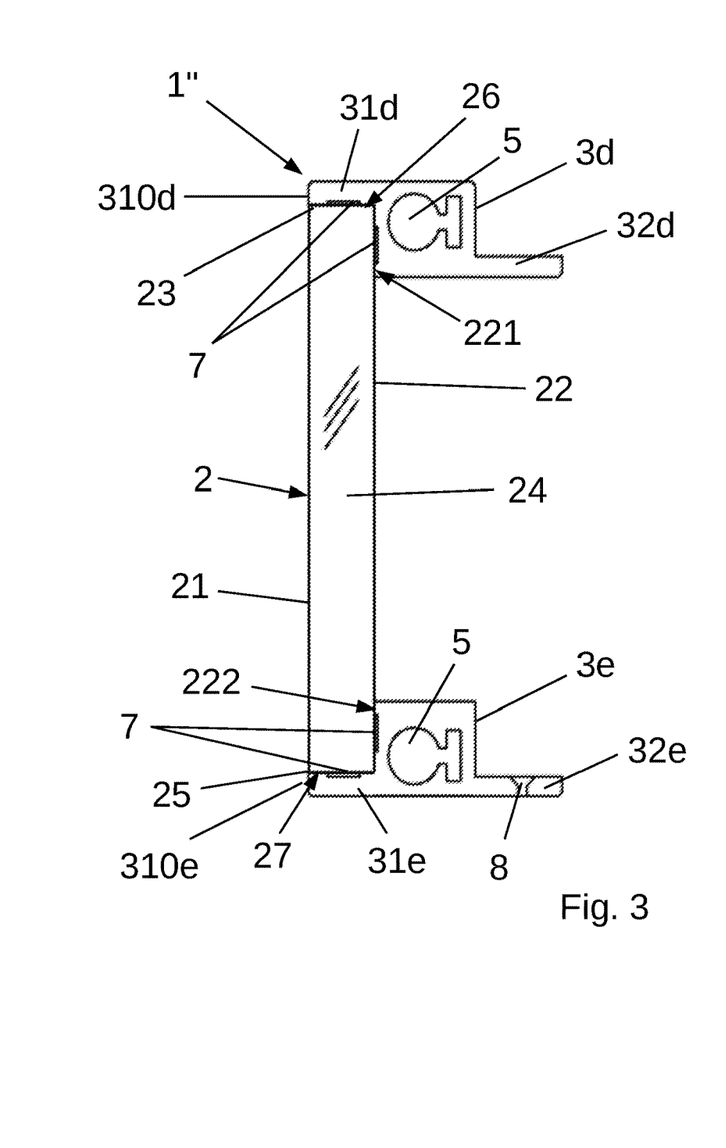
FIG. 3 is a side view of a third embodiment of the kit according to the invention.

FIG. 3 shows a third embodiment of a kit 1'' according to the invention for a display case in a side view. With this kit 1'', the fixation sections 31d, 31e are formed L-shaped. The L-shaped fixation sections 31d, 31e are hereby aligned in such a way that these abut on the panel edges 23, 25 pointing upwards and downwards as well as on the upper and lower edge regions 221, 222 of the panel back side 22. With such an embodiment of the kit 1'' according to the invention, the side panel 2 is held particularly secure by means of the profile strips 3d, 3e.

For fixing the profile strips 3d, 3e on the side panel 2, a seal 7 is provided between the edge region 221, 222 of the panel back side 22 and the fixation section 31d, 31e as well as between the side edge 23, 25 and the fixation section 31d, 31e. The seal 7 is made of silicon in the example depicted in FIG. 3, but can also consist of acrylic or another adhesive in further variants of the kit 1''.

For a visually very appealing display case, a front edge 310d, 310e of the profile strip 3d, 3e ends flush with the panel front side 21 of the side panel 2.

Figure 4:
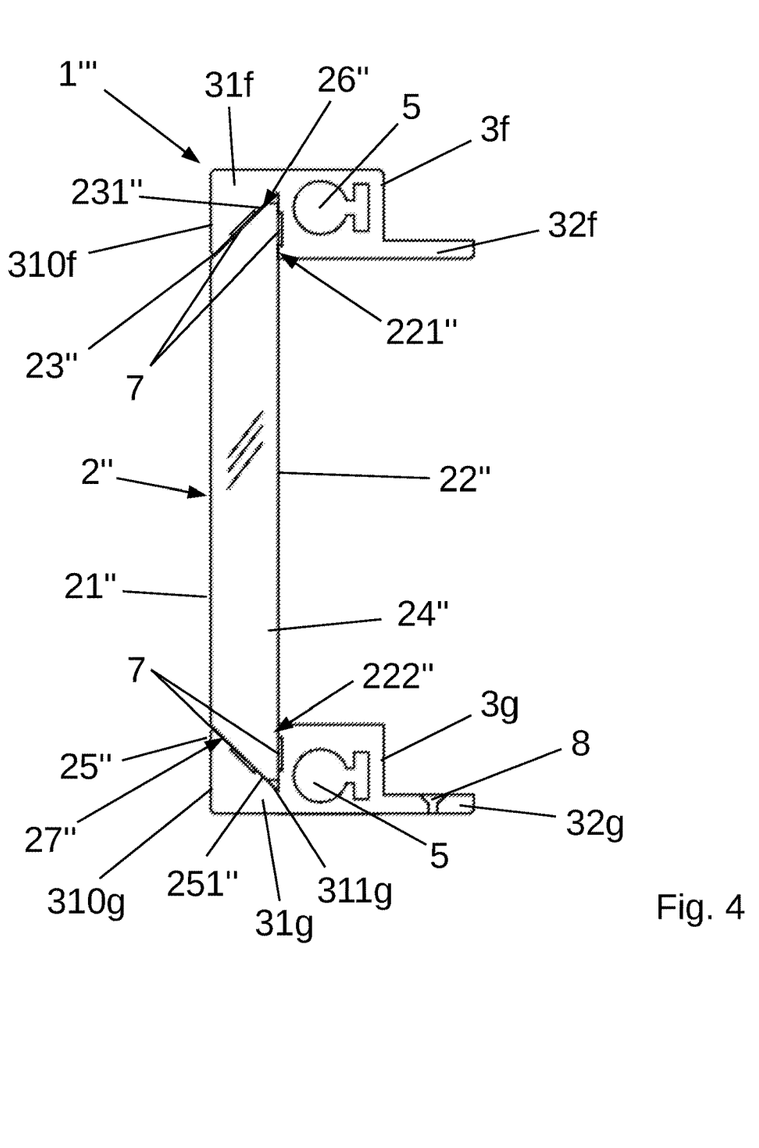
FIG. 4 is a side view of a fourth variant of the kit according to the invention.

FIG. 4 shows a fourth variant of the display case kit 1'' according to the invention for a display case according to the invention in a side view, wherein the panel edges 23'', 25'' of the side panel 2'' pointing upwards and downwards comprise a chamfer 231'', 251'' in this embodiment. The chamfer 231'', 251'' is arranged in such a way that the thickness of the side panel 2'' tapers towards the holding section 32f, 32g of the profile strips 3f, 3g.

For an ideal fixation of the profile strips 3f, 3g on such a side panel 2'', the fixation sections 31f, 31g of the profile strips 3f, 3g each comprise an angle groove 311f, 311g complementarily formed to the chamfer 231'', 251'', extending in longitudinal direction of the profile strip 3f, 3g. In the embodiment of the kit 1'' depicted in FIG. 3, the angle groove 311f, 311g contains a triangular cross section. In alternative variants of the display case kit according to the invention, the angle groove 311f, 331g inserted in the fixation section 31f, 31g can also contain a different cross section. Thus, the angle groove 311f, 311g can for example have a rectangular or trapezoidal cross section. Furthermore, the angle groove 311f, 311g also does not have to be entirely complementary to the shape of the edge region of the side panel 2'' but can also be formed only partly complementary to the edge region.

In the embodiment of the display case kit 1'' depicted in FIG. 4, the angle groove 311f, 311g is arranged in the fixation section 31f, 31g in such a way that the front edge 310f, 310g of the profile strip 3f, 3g ends flush with the panel front side 21''. Likewise, the profile strip 3f, 3g can also project over the panel front side 21'' or can be indented in relation to the aforesaid in further variants of the display case kit 1'' according to the invention.

In principle, the height and width of the profile strip 3f, 3g can be chosen freely. In the depicted embodiment, the profile strip 3f, 3g however contains a height and width in a range of 0.8 cm to 1.5 cm, preferably 1 cm. Such a height and width has proven particularly advantageous since the side panel 2'' can be held particularly well with such a height and width and, the view inside the display case is not unnecessarily impaired by the profile strips 3f, 3g at the same time.

Figure 5:
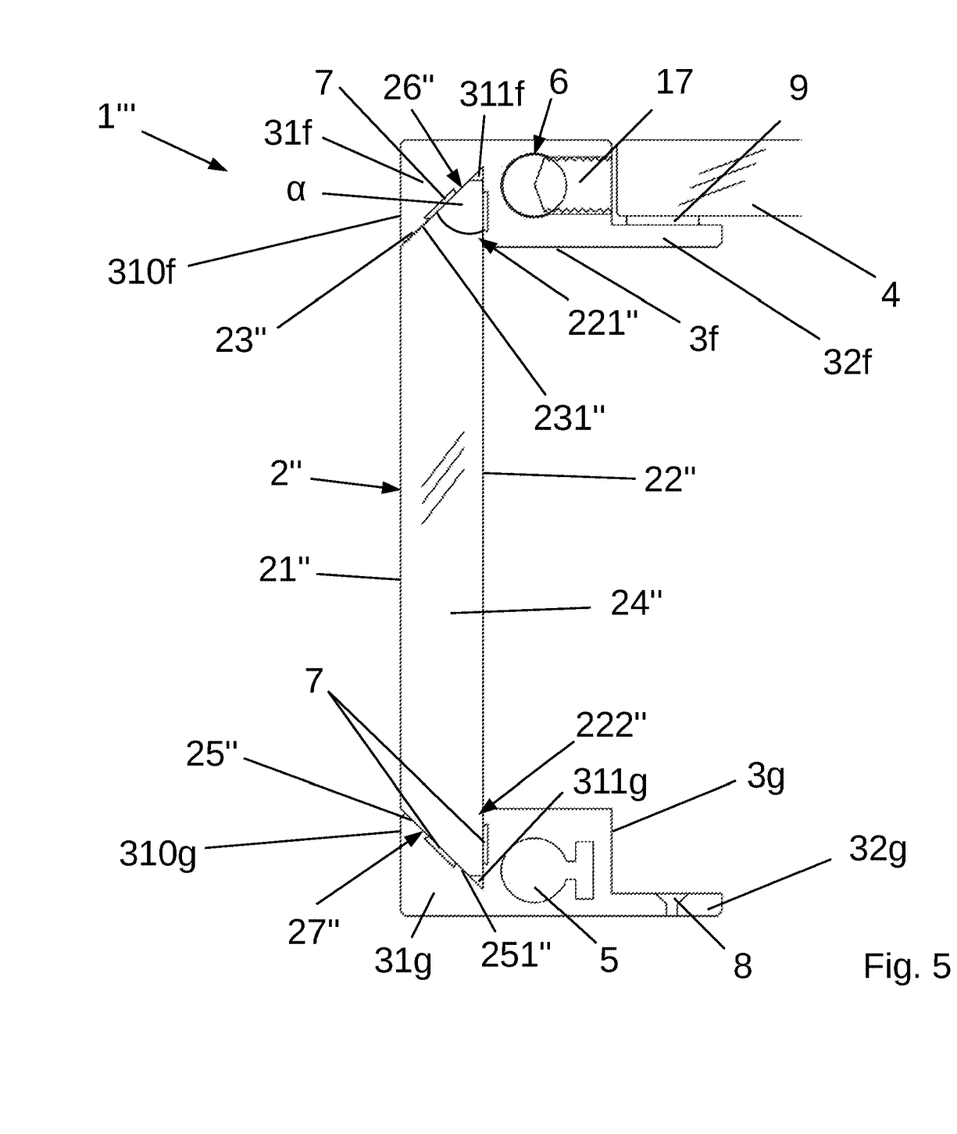
FIG. 5 is a side view of the fourth embodiment depicted in FIG. 4 of the kit according to the invention with a cover plate placed on a profile strip.

FIG. 5 shows the embodiment of the kit 1'' according to the invention depicted in FIG. 4 with a cover plate 4 placed on a profile strip 3f in a side view. In the depicted embodiment, the cover plate 4 is merely placed on the profile strip 3f without being additionally fixed. In further variants of the kit 1'' according to the invention, the cover plate 4 can also be connected temporarily with the profile strip 3f for example by means of at least one screw, one stud or a temporary adhesive.

A seal 9 is provided between the cover plate 4 and the holding section 32f of the profile strip 3f, which enables a gentle placement of the cover plate 4 onto the profile strip 3 made of aluminum. In the shown example, the seal 9 is made of silicone but can also be made of acrylic or rubber in further variants.

In the variant of the display case kit 1''' depicted in FIG. 5, a profile strip connecting element 6 is plugged into the insert 5 provided in the holding section 32f by means of which two adjacent profile strips 3f can be connected.

The used profile strip connecting element 6 is shown in more detail in a top view in FIG. 6.

The profile strip connecting element 6 consists of two dowels 61, 62, which are flexibly linked on one end by means of a stud 63. In order to optimally connect the dowels 61, 62 with each other, a recess is provided in the end of a first of the two dowels 62, in which the end of a second of the two dowels 61 is inserted. In order for the second dowel 61 to be inserted into the recess of the first dowel 62, in spite of it having the same cross section as the first dowel 62, the end of the second dowel 61 is flattened and is adjusted to the size and form of the recess of the first dowel 62.

In alternative embodiments of the kit according to the invention, both dowels can also be connected in another way. Thus, a screw can for example be used to connect the dowels 61, 62 instead of a stud, or the ends of both dowels 61, 62 are plugged into insert devices being flexibly connected with each other. Depending on how the profile strip connecting element 6 is formed, the insert 5 for the profile strip connecting element 6 is formed accordingly. Advantageously, the insert 5 is formed complementary or predominantly complementary to the profile strip connecting element 6 so that the profile strip connecting element 6 can be plugged safely into the insert 5 without slipping out or shifting. Furthermore, the insert 5 should not be too small as the profile strip connecting element 6 cannot completely be plugged into the insert 5, whereby an unpleasant gap could be the result between the side panels 2 to be connected with each other.

Due to the flexible connection of the dowels 61, 62, two profile strips 3, 3a, 3b, 3c, 3d, 3e, 3f, 3g can be connected particularly easily and can be aligned to each other at angle between 90° or 180°. For this purpose, one of the dowels 61 is plugged into the first profile strip 3, 3a, 3b, 3c, 3d, 3e, 3f, 3g and the second dowel 62 is plugged into the second profile strip 3, 3a, 3b, 3c, 3d, 3e, 3f, 3g to be connected with the first profile strip 3, 3a, 3b, 3c, 3d, 3e, 3f, 3g. Due to the dowel-like embodiment of the profile strip connecting element 6, the dowels 61, 62 cannot only be plugged easily into the inserts 5 of the profile strips 3, 3a, 3b, 3c, 3d, 3e, 3f, 3g but can also be pulled out easily from the inserts 5 when disassembling the display case.

For a particularly easy insertion of the dowels 61, 62 as well as for fixing the dowels 61, 62 in the inserts 5, a constriction 611, 622 each is provided on the ends of the non-connected dowels 61, 62. Here, a grub screw 17 engages in order to build a connection between the elements.

In the shown example, the constriction 611, 622 is formed in shape of a V-shaped notch extending around the circumference. Moreover, the constriction 611, 622 can also have a rectangular or U-shaped cross section in other variants.

When loosening the grub screw 17, the dowels 61, 62 can be pulled out from the insert 5.

Figure 7:
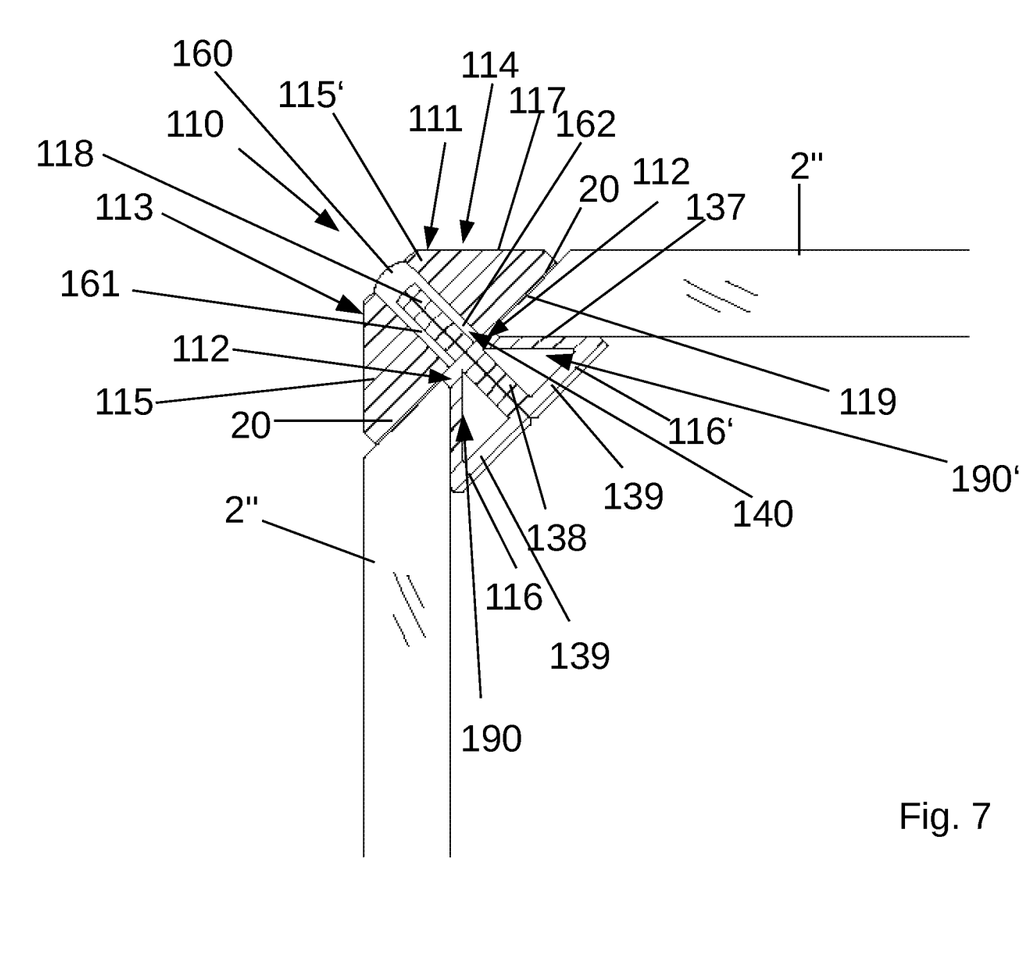
FIG. 7 is an illustration showing an embodiment of an edge profile on a side corner of an embodiment of a display case of the present invention.

FIG. 7 shows a partial view of an embodiment of a display case of the present invention, wherein in this figure only one side edge 110 of the display case is shown.

At the side edge 110, an edge profile 111 is mounted. The edge profile 111 is provided between two side panels 2", 2" of the display case.

The side panels 2", 2" are frameless. Each have of the side panels 2", 2" has a miter 20 on at least one end. The end having the miter 20 is introduced in an acute angled miter seat 112 of the edge profile 111, respectively.

The edge profile 111 used in the embodiment of FIG. 7 contains a first edge profile part 113 and a second edge profile part 114. The second edge profile part 114 is a mirror-inversed construction of the first edge profile part 113.

The first edge profile part 113 and the second edge profile part 114 each have a cross section having a triangularly shaped outer portion 115, 115' and a triangularly shaped inner portion 116, 116'.

The triangularly shaped outer portion 115, 115' contains an outer portion hypotenuse 117, a first outer portion cathetus 118 and a second outer portion cathetus 119. Between the first outer portion cathetus 118 and the second outer portion cathetus 119 a right angle is formed.

The triangularly shaped inner portion 116, 116' is formed as one piece with the outer portion 115, 115', respectively. In other embodiments of the invention, the triangularly shaped inner portion 116, 116' can also be fixed to the outer portion 115, 115', respectively.

The triangularly shaped inner portion 116, 116' has an inner portion hypotenuse 137, a first inner portion cathetus 138 and a second inner portion cathetus 139. Between the first inner portion cathetus 138 and the second inner portion cathetus 139, a right angle is formed.

The outer portion hypotenuse 117 and the inner portion hypotenuse 137 are provided parallel to each other. The first outer portion cathetus 118 is in parallel with the first inner portion cathetus 138.

The acute angled miter seat 112 is provided between the second outer portion cathetus 119 and the inner portion hypotenuse 137.

The first edge profile part 113 and the second edge profile part 114 each have a notch 140 provided in parallel to the respective first outer portion cathetus 118.

The edge profile 111 comprises a connecting and sealing unit 160 having a U-shaped cross-section with two legs 161, 162 being introduced or formed for an introduction into the notches 140 from the outside.

Figure 8:
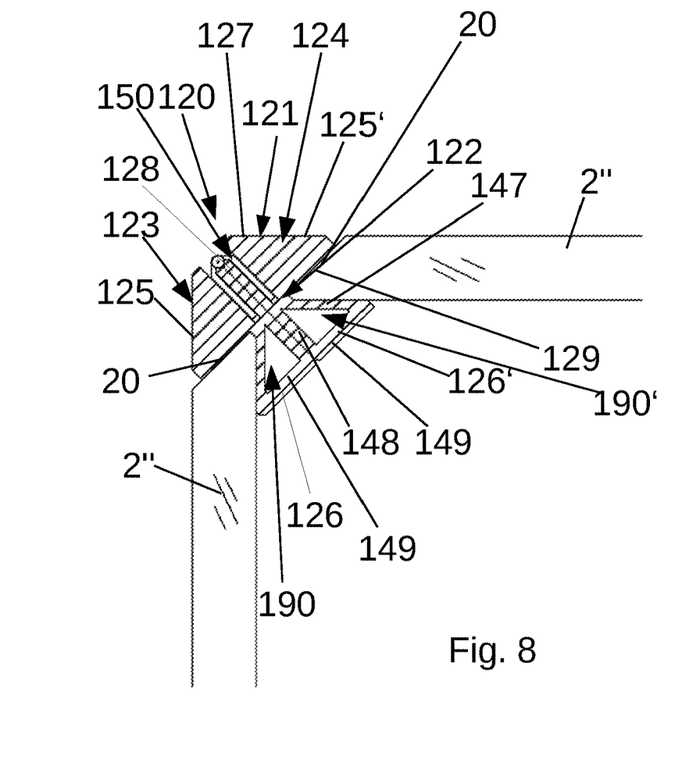
FIG. 8 is an illustration of a further embodiment of the edge profile on the side corner of an embodiment of the display case of the present invention in a closed state.
Figure 9:
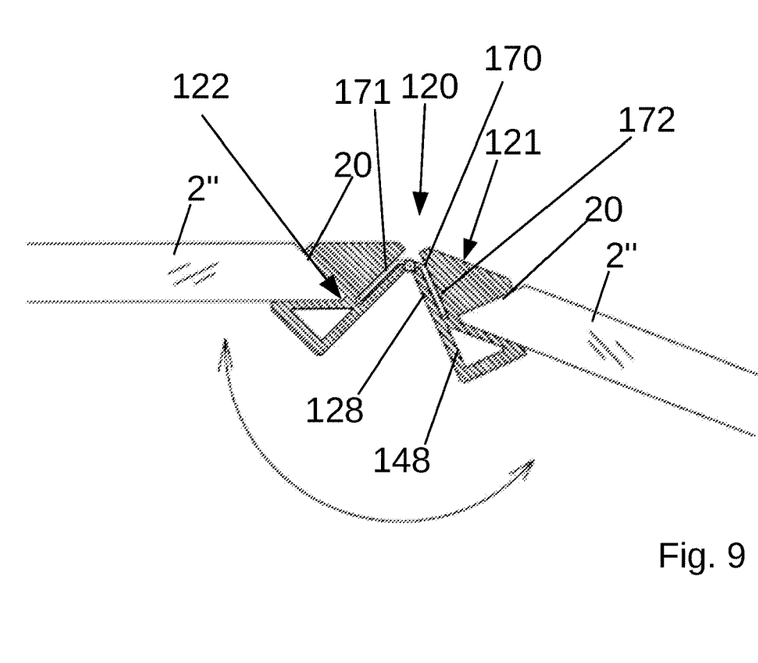
FIG. 9 is an illustration of the edge profile on the side corner of the embodiment of the display case of FIG. 8 in an open state.

FIGS. 8 and 9 are partial views of another embodiment of a display case of the present invention. In the embodiment of FIGS. 8 and 9, an edge profile 121 is mounted at a side edge 120 of the display case. The edge profile 121 is provided between two side panels 2", 2" of the display case.

The side panels 2", 2" are frameless. Each have of the side panels 2", 2" has a miter 20 on at least one end. The miter 20 is introduced in an acute angled miter seat 122 of the edge profile 121, respectively.

The edge profile 121 used in the embodiment of FIGS. 8 and 9 contains a first edge profile part 123 and a second edge profile part 124. The second edge profile part 124 is a mirror-inversed construction of the first edge profile part 123.

The first edge profile part 123 and the second edge profile part 124 each have a cross section having a triangularly shaped outer portion 125, 125' and a triangularly shaped inner portion 126, 126'.

The triangularly shaped outer portion 125, 125' contains an outer portion hypotenuse 127, a first outer portion cathetus 128 and a second outer portion cathetus 129. Between the first outer portion cathetus 128 and the second outer portion cathetus 129, a right angle is formed.

The triangularly shaped inner portion 126, 126' is formed as one piece with the outer portion 125, 125', respectively. In other embodiments of the invention, the triangularly shaped inner portion 126, 126' can also be fixed to the outer portion 125, 125', respectively.

The triangularly shaped inner portion 126, 126' has an inner portion hypotenuse 147, a first inner portion cathetus 148 and a second inner portion cathetus 149. Between the first inner portion cathetus 148 and the second inner portion cathetus 149, a right angle is formed.

The outer portion hypotenuse 127 and the inner portion hypotenuse 147 are provided parallel to each other. The first outer portion cathetus 128 is in parallel with the first inner portion cathetus 148.

The acute angled miter seat 122 is provided between the second outer portion cathetus 129 and the inner portion hypotenuse 147.

The first edge profile part 123 and the second edge profile part 124 each have a notch 150 provided in parallel to the respective first outer portion cathetus 128.

The edge profile 121 contains a connecting and/or sealing unit 170 having a V-shaped cross-section with two legs 171, 172 being introduced or formed for an introduction into the notches 150.

In the embodiment shown in FIGS. 8 and 9, the edge profile parts 123, 124 are connected at outer ends of their first outer portion catheti 128 by a hinge 180. By the hinge 180, the edge profile parts 123, 124 and, therefore, the side panels 2", 2", can be folded apart, as shown in FIG. 3, and collapsed, as shown in FIG. 2.

Figure 10:
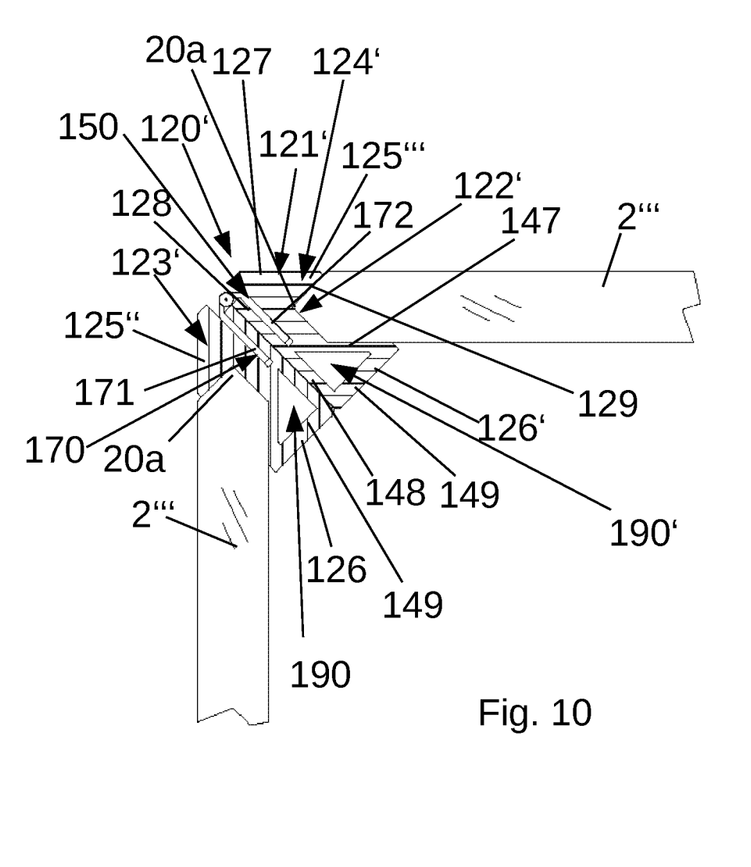
FIG. 10 is an illustration showing another embodiment of an edge profile on a side corner of an embodiment of a display case of the present invention in a closed state.

FIG. 10 schematically shows another embodiment of the edge profile 121' on a side corner of an embodiment of a display case of the present invention in a closed state. The edge profile 121' is provided between two frameless side panels 2''', 2''' of the display case, wherein these side panels 2''', 2''' have a tip 20a on their ends, respectively. The pointed ends are directly vis-à-vis the edge profile 121'. The respective tip 20a is received in a tip seat 122' of the edge profile 121', respectively.

The edge profile 121' used in the embodiment of FIG. 10 contains a first edge profile part 123' and a second edge profile part 124'. The second edge profile part 124' is a mirror-inversed construction of the first edge profile part 123'.

The first edge profile part 123' and the second edge profile part 124' each have a cross section having a triangularly shaped outer portion 125'', 125''' and a triangularly shaped inner portion 126, 126'.

The triangularly shaped outer portion 125'', 125''' contains an outer portion hypotenuse 127, a first outer portion cathetus 128 and a second outer portion cathetus 129 between the first outer portion cathetus 128 and the second outer portion cathetus 129, a right angle is formed.

The triangularly shaped inner portion 126, 126' is formed as one piece with the outer portion 125'', 125''', respectively. In other embodiments of the invention, the triangularly shaped inner portion 126, 126' can also be fixed to the outer portion 125'', 125''', respectively.

The triangularly shaped inner portion 126, 126' has an inner portion hypotenuse 147, a first inner portion cathetus 148 and a second inner portion cathetus 149. Between the first inner portion cathetus 148 and the second inner portion cathetus 149, a right angle is formed.

The outer portion hypotenuse 127 and the inner portion hypotenuse 147 are provided parallel to each other. The first outer portion cathetus 128 is in parallel with the first inner portion cathetus 148.

The tip seat 122' is provided between the second outer portion cathetus 129 and the inner portion hypotenuse 147.

The first edge profile part 123' and the second edge profile part 124' each have a notch 150 provided in parallel to the respective first outer portion cathetus 128.

The edge profile 121' contains a connecting and/or sealing unit 170 having a V-shaped cross-section with two legs 171, 172 being introduced or formed for an introduction into the notches 150.

In the embodiment shown in FIG. 10, the edge profile parts 123', 124' are connected at outer ends of their first outer portion catheti 128 by a hinge 180. By the hinge 180, the edge profile parts 123', 124' and, therefore, the side panels 2''', 2''', can be folded apart, as shown in FIG. 9, and collapsed, as shown in FIG. 10.

In the embodiments shown in FIGS. 7 to 10, corners of the edge profile parts 113, 114, 123, 123', 124, 124' are flattened. In other not-shown embodiments of the invention, the edges can be rounded or spiky.

In the embodiments shown in FIGS. 7 to 10, the outer portions 115, 115', 125, 125', 125'', 125''' of the edge profile parts 113, 114, 123, 123', 124, 124' are formed of solid material such as of aluminum, and the inner portions 116, 116', 126, 126' of the edge profile parts 113, 114, 123, 123', 124, 124' can also be of aluminum but are internally hollow, forming hollow spaces 190, 190'.

Figure 11:
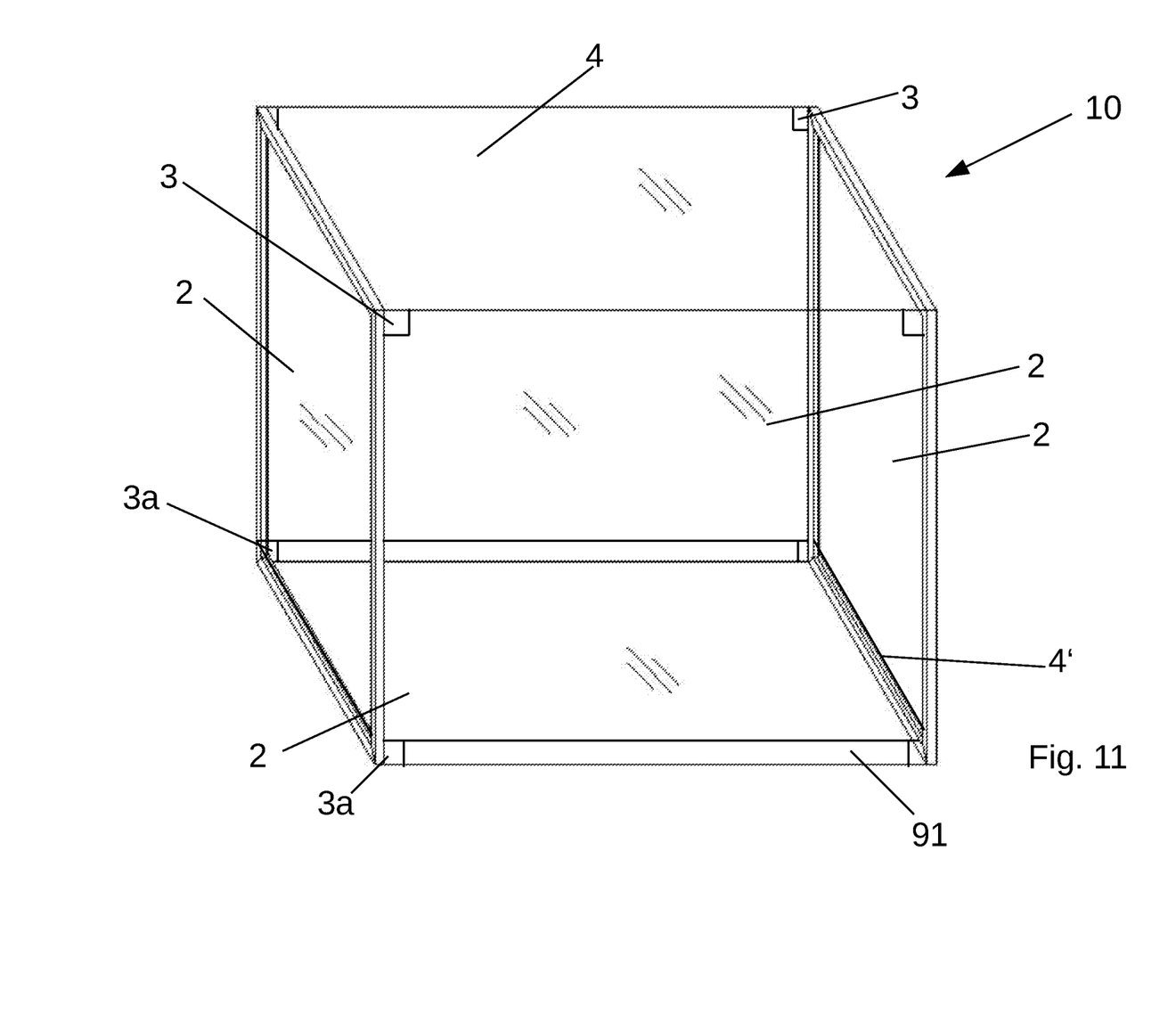
FIG. 11 is a diagrammatic, perspective view of an embodiment of the display case of the present invention.

FIG. 11 schematically shows the display case 10 according to an embodiment of the present invention. The display case 10 contains four frameless side panels 2, a bottom plate 4', a sub-floor 91 and the cover plate 4. In the embodiment shown, the cover plate 4 as well as the side panels 2 are formed from glass. As schematically shown in FIG. 11, at the upper ends of the side panels 2, the profile strips 3, as shown in FIG. 1, are provided. The profile strips 3 hold the cover plate 4. As it is furthermore schematically shown in FIG. 11, at the lower ends of the side panels 2 the profile strips 3a, as shown in FIG. 1, are provided. The profile strips 3a hold the bottom plate 4'. In other embodiments of the present invention, instead of the side panels 2, other frameless side panels 2', 2'' or 2''', as shown in FIGS. 2 to 5, can be used. Furthermore, other profile strips, as shown in FIGS. 2 to 5, can be used instead of the profile strips 3, 3a.

Figure 12:
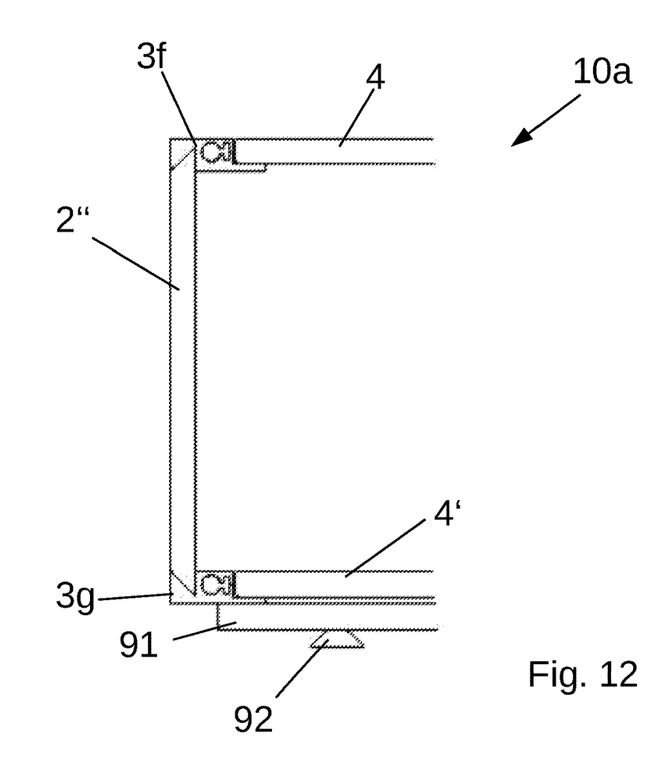
FIG. 12 is an illustration showing a detail of an embodiment of the display case of the present invention.

FIG. 12 shows schematically a detail of an embodiment of a display case 10a of the present invention. The display case 10a has, similarly to the display case 10 of FIG. 11, four frameless side panels 2'', as exemplarily shown in FIG. 5, a bottom plate 4' and a cover plate 4. In the embodiment shown, the cover plate 4 as well as the side panels 2 are formed from glass. At the upper ends of the side panels 2'', profile strips 3f, as shown in FIG. 5, are provided. The profile strips 3f hold the cover plate 4. As it is furthermore schematically shown in FIG. 12, at the lower ends of the side panels 2'' profile strips 3g, as shown in FIG. 5, are provided. The profile strips 3g hold the bottom plate 4'.

Under the bottom plate 4', a sub-floor 91 is provided. The display case 10a stands on feet 92 provided below the sub-floor 91.

Figure 13:
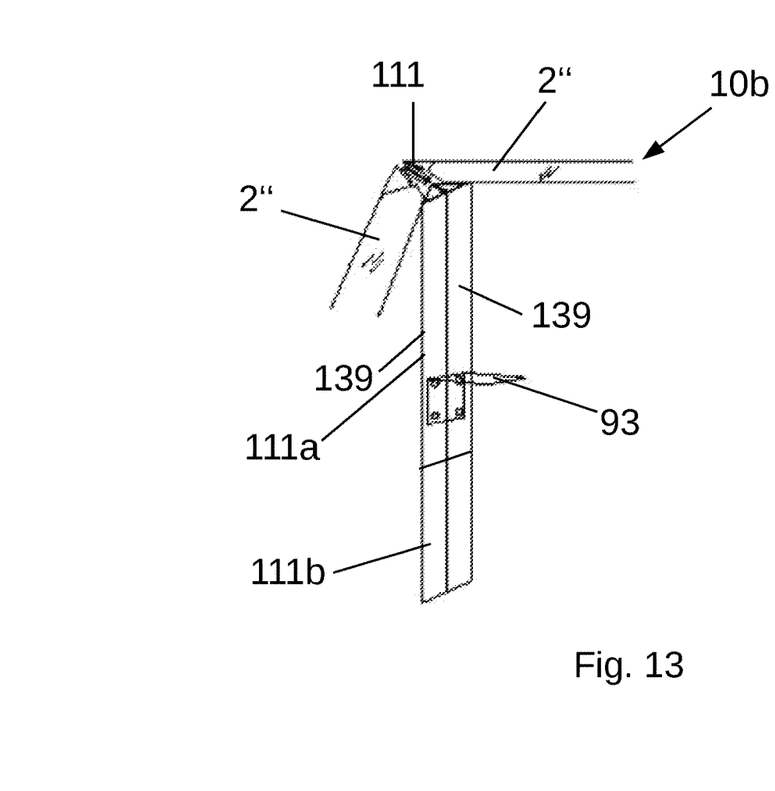
FIG. 13 is an illustration showing another detail of an embodiment of the display case of the present invention.

FIG. 13 shows schematically another detail of an embodiment of a display case 10b of the present invention. The display case 10b has four frameless side panels 2'', a bottom plate 4', a cover plate 4 and profile strips, similarly like the display case 10 of FIG. 11, wherein the form of the side panels and the profile strips can differ as mentioned above. The sides panels 2'' of the display case 10b are connected at their vertical side edges by an edge profile 111 as shown in FIG. 7.

As described above with reference to FIG. 7, the edge profile 111 has inner portion catheti 139, forming together a flat surface. On the flat surface, a shelf carrier 93 is mounted. Since such a shelf carrier 93 is provided in each of the four edges of the display case, an intermediate shelf of the display case 10b can be laid on these shelf carriers 93.

Furthermore, in the embodiment shown in FIG. 13, the edge profile 111 contains at least two parts 111a, 111b being vertically stacked.

Instead of the edge profile 111, another edge profile such the edge profile 121 of FIGS. 8, 9 or the edge profile 121' of FIG. 10 can be used depending from the shape of the edges of the side panels used.

The invention claimed is:

1. A kit for forming a display case or a part of the display case, the kit comprising:
   at least one frameless side panel having a panel front side, a panel back side, a panel edge extending between said panel front side and said panel back side and four panel corners;
   at least one profile strip extending along said panel edge from a first of said panel corners to a second of said panel corners, said profile strip having a fixation section covering either said panel edge and said panel back side in an edge region, or only said panel back side in said edge region, or only said panel edge, and a holding section being subsequent to said fixation section, said fixation section being glued with at least one of said panel edge or said edge region of said panel back side; and
   at least one insert with a therein inserted or insertable, flexibly formed profile strip connecting element extending in a longitudinal direction of said profile strip and disposed in said holding section;

said profile strip connecting element containing a joint and two dowels connected to each other by said joint, said profile strips configured to be oriented at varying angles relative to each other due to said joint provided between said two dowels.

2. The kit according to claim 1, wherein said dowels each has a constriction formed therein.

3. The kit according to claim 1, wherein said profile strip has an L-shaped cross section, a T-shaped cross section or a Z-shaped cross section.

4. The kit according to claim 1, wherein said fixation section is formed at least partly complementary to an angle, which said panel edge forms with said panel back side.

5. The kit according to claim 1, wherein said panel edge has a chamfer and said fixation section has an angle groove formed therein at least partly complementary to said chamfer, wherein said chamfer is aligned in such a way that a thickness of said frameless side panel tapers towards said holding section and said panel front side ends flush with a front edge of said fixation section.

6. The kit according to claim 5, wherein said chamfer forms a miter and said angle groove has a triangular cross section.

7. The kit according to claim 5, further comprising at least one adhesive or sealant disposed in said angle groove, between said frameless side panel and said fixation section.

8. The kit according to claim 1, wherein said holding section has a through bore formed therein for an insertion of a fixation element aligned transversely to the longitudinal direction of said profile strip.

9. The kit according to claim 1, further comprising:
a cover or a bottom plate; and
at least one seal disposed between said holding section and said cover or bottom plate.

10. The kit according to claim 1, wherein said profile strip is not higher and not wider than 1 cm in cross section.

11. The kit according to claim 1, wherein said insert has a connecting bar, a round cross section part and a rectangular cross section part connected to said round cross section part by said connecting bar.

* * * * *